United States Patent
Mengibar et al.

(10) Patent No.: US 8,868,409 B1
(45) Date of Patent: Oct. 21, 2014

(54) EVALUATING TRANSCRIPTIONS WITH A SEMANTIC PARSER

(71) Applicant: Google Inc., Mountain View, CA (US)

(72) Inventors: Pedro J. Moreno Mengibar, Jersey City, NJ (US); Fadi Biadsy, New York, NY (US); Diego Melendo Casado, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/157,020

(22) Filed: Jan. 16, 2014

(51) Int. Cl.
*G06F 17/27* (2006.01)
*G06F 17/21* (2006.01)
*G10L 15/26* (2006.01)
*G10L 17/00* (2013.01)
*G10L 15/04* (2013.01)

(52) U.S. Cl.
CPC ..................................... *G10L 15/26* (2013.01)
USPC ............... 704/9; 704/235; 704/246; 704/250; 704/251; 704/252; 704/10

(58) Field of Classification Search
USPC ................ 704/235, 246, 250, 251, 252, 9, 10
See application file for complete search history.

(56) References Cited

U.S. PATENT DOCUMENTS

| | | | |
|---|---|---|---|
| 5,457,768 A | 10/1995 | Tsuboi et al. | |
| 5,500,920 A | 3/1996 | Kupiec | |
| 5,606,644 A * | 2/1997 | Chou et al. | 704/243 |
| 6,278,968 B1 | 8/2001 | Franz et al. | |
| 6,374,217 B1 * | 4/2002 | Bellegarda | 704/240 |
| 6,374,220 B1 | 4/2002 | Kao | |
| 8,036,464 B2 * | 10/2011 | Sridhar et al. | 382/177 |
| 8,504,355 B2 | 8/2013 | Ylonen | |
| 2001/0041978 A1 | 11/2001 | Crespo et al. | |
| 2002/0198713 A1 * | 12/2002 | Franz et al. | 704/252 |
| 2003/0216905 A1 * | 11/2003 | Chelba et al. | 704/9 |
| 2004/0006465 A1 | 1/2004 | Phillips et al. | |
| 2004/0215449 A1 | 10/2004 | Roy | |
| 2004/0243393 A1 | 12/2004 | Wang | |
| 2004/0249636 A1 * | 12/2004 | Applebaum et al. | 704/231 |
| 2005/0055209 A1 * | 3/2005 | Epstein et al. | 704/255 |

(Continued)

FOREIGN PATENT DOCUMENTS

| | | |
|---|---|---|
| WO | WO02054033 | 7/2002 |
| WO | WO03001504 | 1/2003 |

OTHER PUBLICATIONS

Sameer Pradhan; Hacioglu, Kadri; Ward, Wayne; Martin, J.H.; Jurafsky, D., "Semantic role parsing: adding semantic structure to unstructured text," Data Mining, 2003. ICDM 2003. Third IEEE International Conference on , vol., no., pp. 629,632, Nov. 19-22, 2003.*

(Continued)

*Primary Examiner* — Edgar Guerra-Erazo (74) *Attorney, Agent, or Firm* — Fish & Richardson P.C.

(57) ABSTRACT

In some implementations, audio data for an utterance is provided over a network. At a client device and over the network, information is received that indicates candidate transcriptions for the utterance and semantic information for the candidate transcriptions. A semantic parser is used at the client device to evaluate each of at least a plurality of the candidate transcriptions. One of the candidate transcriptions is selected based on at least the received semantic information and the output of the semantic parser for the plurality of candidate transcriptions that are evaluated.

25 Claims, 6 Drawing Sheets

(56) References Cited

U.S. PATENT DOCUMENTS

| | | | |
|---|---|---|---|
| 2008/0177547 | A1 | 7/2008 | Yaman et al. |
| 2009/0024385 | A1* | 1/2009 | Hirsch .............................. 704/9 |
| 2009/0030686 | A1* | 1/2009 | Weng et al. ................... 704/240 |
| 2009/0067719 | A1* | 3/2009 | Sridhar et al. ................ 382/176 |
| 2011/0161347 | A1* | 6/2011 | Johnston ....................... 707/769 |
| 2012/0215539 | A1 | 8/2012 | Juneja |
| 2013/0325436 | A1 | 12/2013 | Wang et al. |

OTHER PUBLICATIONS

Tang, L. R. (2007). Learning an ensemble of semantic parsers for building dialog-based natural language interfaces. In KI 2006: Advances in Artificial Intelligence (pp. 102-112). Springer Berlin Heidelberg.*

Bohus, Dan et al., "Integrating Multiple Knowledge Sources for Utterance-Level Confidence Annotation in the CMU Communicator Spoken Dialog System," School of Computer Science, Carnegie Mello University, Nov. 2002, 29 pages.

Confidence Annotator from Olympus, downloaded from the Internet on May 9, 2013, http://wiki.speech.cs.cmu.edu/olympus/index.php/Confidence_Annotator, 1 page.

Giuglea, Ana-Maria et al., "Towards Free-text Semantic Parsing: A Unified Gramework Based on FrameNet, VerbNet and PropBank," 17the European Conference on Artificial Intelligence, 2006, 8 pages.

Helios from Olympus, downloaded from the internet on May 9, 2013, http://wiki.speech.cs.cmu.edu/olympus/index.php/ Helio, 2 pages.

Phoenix Server from Olympus, downloaded from the internet on May 9, 2013, http://wiki.speech.cs.cmu.edu/olympus/index.php/Phoenix, 5 pages.

"Statistical Relational Learning for NLP," Ray Mooney & Razvan Bunescu, Statistical Relational Learning, Presented by Michele Banko, downloaded from the internet on May 9, 2013, http://www.cs.washington.edu/education/courses/cse574/05sp/slides/nlp-michele.ppt, 25 pages.

Toutanova, Kristina Nikolova, "Effective Statistical Models for Syntactic and Semantic Disambiguation," A Dissertation submitted to the Department of Computer Science and the Committee on Graduate Studies of Stanford University in partial fulfillment of the requirements for the Degree of Doctor of Philosophy, Sep. 2005, 186 pages.

* cited by examiner

EVALUATING TRANSCRIPTIONS WITH A SEMANTIC PARSER

TECHNICAL FIELD

This specification describes technologies related to speech recognition and semantic parsing.

BACKGROUND

Automatic speech recognition is an important technology that is used in mobile devices and other devices. In general, automatic speech recognition attempts to provide accurate transcriptions of what a person has said. A transcription of a user's speech can be used by a mobile device, for example, to trigger an action such as initiating a phone call, sending a message, opening an application, etc.

SUMMARY

Semantic parsing techniques can be carried out on a server and on a client device to determine a likely meaning of an utterance provided to a speech recognition system. When a client device receives an utterance, the client device can send data about the utterance to a server-based speech recognition system, which can generate multiple candidate transcriptions, i.e., the n-best hypotheses, for the utterance. The server can perform an initial semantic parsing of the candidate transcriptions to determine semantic categories and scores for words or phrases in the transcriptions. Some of the categories and/or scores may be inaccurate if determined by the server, because an accurate classification may depend on information, e.g., an application list, a contact list, a calendar, photos, etc., that is not accessible to the server. For example, it may not be accurate for a server-based semantic parser to determine whether a name represents a person in a user's contact list if the contact list is private information that is not shared with the server.

To enhance the semantic evaluation of candidate transcriptions, additional semantic parsing may occur at the client device. Multiple candidate transcriptions can be sent to the client device, along with semantic information determined from the initial semantic parsing performed by the server. The client device performs additional semantic parsing using data that is accessible to the client device but was not accessible to the server. The client device may evaluate each of multiple transcriptions with a semantic parser, since the best transcription may not be the transcription with the highest speech recognition confidence. By applying the local sematic parser of the client device to multiple candidate transcriptions, the client device can update the semantic classifications and scores determined by the server. The client device selects a candidate transcription using the updated semantic information, which may be a composite of information received from the server as well as semantic information determined by the client device. When the client device determines that the selected transcription represents a command to the client device, the client device can perform an action, e.g., calling a contact, opening an application, etc., that corresponds to the selected transcription.

In general, one innovative aspect of the subject matter described in this specification can be embodied in methods that include the actions of providing, over a network, audio data for an utterance; receiving, at a client device and over the network, information that indicates candidate transcriptions for the utterance and semantic information for the candidate transcriptions; using a semantic parser at the client device to evaluate each of at least a plurality of the candidate transcriptions; and selecting one of the plurality of the candidate transcriptions based on at least the received semantic information and the output of the semantic parser at the client device for the plurality of candidate transcriptions that are evaluated. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, receiving the information that indicates multiple candidate transcriptions for the utterance may include receiving information indicating a list of candidate transcriptions. In some implementations, receiving the information that indicates multiple candidate transcriptions for the utterance may include receiving a speech recognition lattice indicating multiple possible transcriptions for the utterance.

In some implementations, receiving information that indicates semantic information for the candidate transcription may include receiving information indicating first semantic scores for one or more terms in the candidate transcriptions. Using the semantic parser at the client device may include determining second semantic scores for one or more terms in the candidate transcriptions. Selecting one of the plurality of candidate transcriptions may include selecting one of the plurality of candidate transcriptions based on the first semantic scores and the second semantic scores. The first semantic scores and the second semantic scores may indicate likelihoods that terms belong to one or more semantic categories. The first semantic scores may indicate likelihoods that terms belong to first semantic categories, and the second semantic scores may indicate likelihoods that terms belong to second semantic categories, including one or more semantic categories not included in the first semantic categories. Determining the second semantic scores may include determining the second semantic scores at the client device using information that is available at the client device and is not available to a device that generated the first semantic scores.

In some implementations, using a semantic parser to evaluate each of at least a plurality of the candidate transcriptions may include receiving a semantic parser confidence score for each of the plurality of candidate transcriptions, and selecting one of the plurality of the candidate transcriptions may include selecting one of the plurality of candidate transcriptions based on the semantic parser confidence scores. Selecting one of the plurality of the candidate transcriptions may include determining, based on output of the semantic parser for the plurality of candidate transcriptions that are evaluated, that one of the plurality of candidate transcriptions represents a voice action, and selecting the candidate transcription determined to represent a voice action. In some implementations, a type of action indicated by the selected candidate transcription may be determined, likely semantic categories for words in the selected candidate transcription may be determined, and an action according to the determined type of action and the likely semantic categories may be performed.

The subject matter described in this specification can be implemented in particular embodiments so as to realize one or more of the following advantages. In some implementations, a semantic parser may determine personalized results for a user while maintaining the user's privacy and/or the confidentiality of data on the user's device. In some implementations, parsing quality may be improved, and may be less susceptible to speech recognition errors. In some implementations, the computational needs of a client device may be reduced, as speech recognition and preliminary semantic parsing may be performed by a server.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
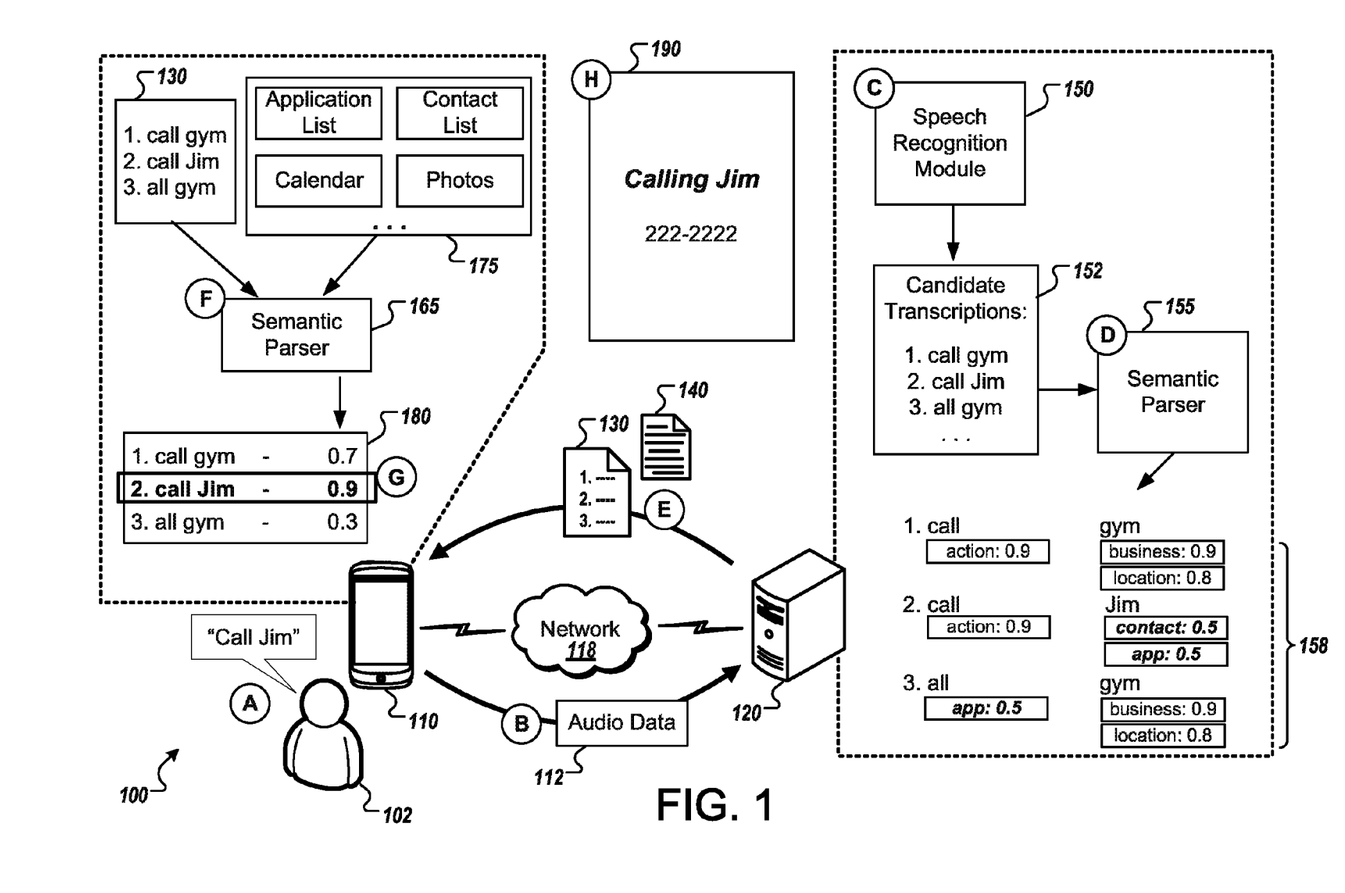
FIG. 1 is a block diagram that illustrates an example of a system for evaluating transcriptions with semantic parsers.

FIG. 1 is a block diagram that illustrates an example of a system 100 for evaluating transcriptions with semantic parsers. The system 100 includes a client device 110, a computing system 120, and a network 118. In the example, the client device 110 provides audio data 112 for an utterance to the computing system 120, e.g., a server system, and the client device 110 receives, from the computing system 120, information that indicates candidate transcriptions 130 for the utterance and semantic information 140 for the candidate transcriptions. The figure shows stages (A) to (H) which illustrate a flow of data.

The client device 110 can be, for example, a desktop computer, a laptop computer, a cellular phone, a smart phone, a tablet computer, a wearable computer, a music player, an e-book reader, or a navigation system. For example, the client device 110 may include an integrated microphone, external microphone, or other means for capturing spoken input from a user 102. The functions performed by the computing system 120 can be performed by individual computer systems or can be distributed across multiple computer systems. The network 118 can be wired or wireless or a combination of both, and may include private networks and/or public networks, such as the Internet.

In some implementations, automatic speech recognition systems generate multiple candidate transcriptions for each utterance that is recognized. Semantic evaluation can be used to select an appropriate transcription from the multiple candidates. Each of multiple candidate transcriptions can be evaluated using semantic parsers, and a transcription can be selected based at least in part on the results of semantic parsing. Speech recognition systems often rank candidate transcriptions according to the confidence that the speech recognition has that a result is correct. However, the highest-ranked candidate transcription may not be the most correct transcription, and so it is often helpful to perform semantic parsing for multiple candidate transcriptions and not only the highest-ranked transcription. Output of semantic parsing may indicate that the most appropriate transcription is a candidate transcription other than the highest-ranked candidate transcription.

Evaluation of candidate transcriptions can be performed using semantic parsing at a server as well as additional semantic parsing at a client device. Performing semantic parsing at both the server and the client device allows the user to benefit from the processing resources and complexity of a server, while also benefiting from the use of data that is only accessible to the client device. Both the server and the client device can each perform semantic parsing of multiple candidate transcriptions for an utterance. In some implementations, a device provides audio data for an utterance over a network. The device receives, over the network, information that indicates candidate transcriptions for the utterance and semantic information for the candidate transcriptions. The device uses a semantic parser at the device to evaluate each of at least a plurality of the candidate transcriptions. The device selects one of the plurality of the candidate transcriptions based on at least (i) the received semantic information and (ii) the output of the semantic parser at the device for the plurality of candidate transcriptions that are evaluated.

In the example of FIG. 1, during stage (A), the user 102 speaks, and the client device 110 detects and captures, e.g., samples and/or records, the utterance of the user. For example, the user 102 may speak words that represent a voice command or action to be performed. In the present example, the user 102 utters the phrase "call Jim" to express a command instructing the client device 110, e.g., a smart phone, to initiate a telephone call with a person named "Jim."

During stage (B), the client device 110 transmits audio data 112 that represents the user's utterance to the computing system 120 over the network 118. The audio data 112 may be a digital representation of the utterance, for example, and may include recorded or streamed audio signals, and/or may include audio features extracted from the signals. For example, the audio data 112 can be transmitted by the client device 110 to the computing system 120 using a suitable file transfer or streaming protocol.

Figure 4A:
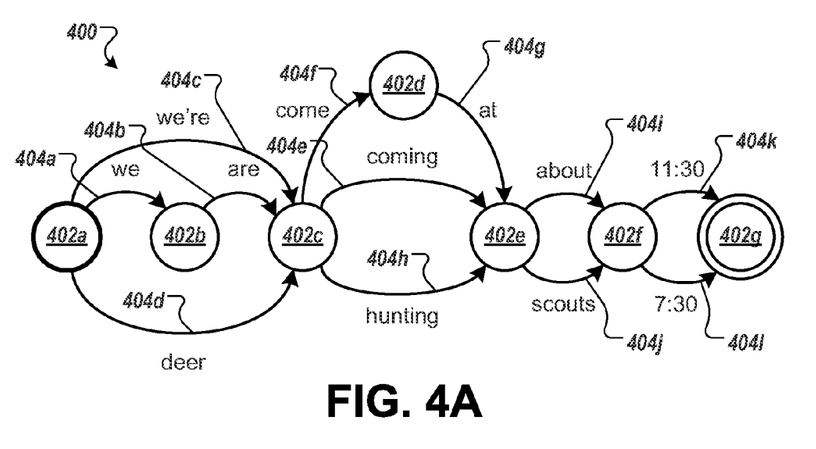
FIGS. 4A and 4B are diagrams that illustrate examples of word lattices.
Figure 4B:
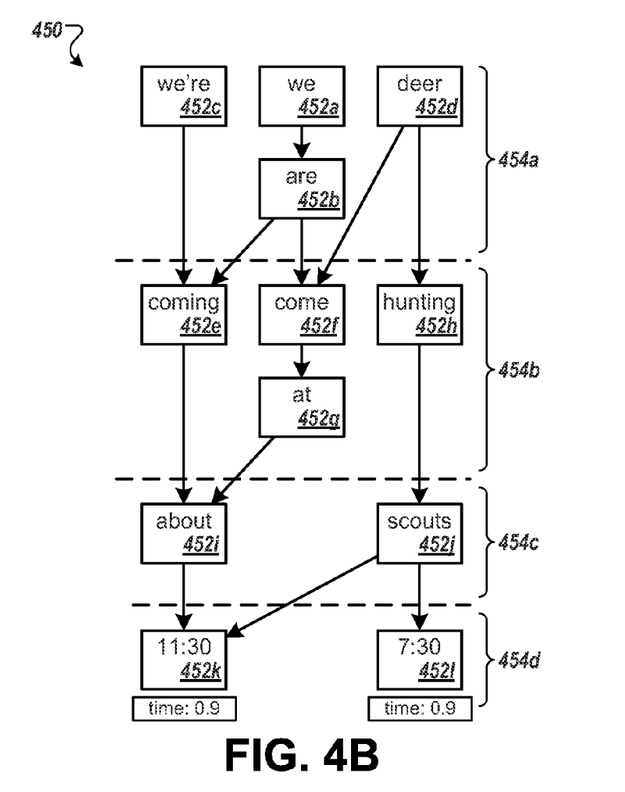

During stage (C), the computing system 120 uses a speech recognition module 150 to process the audio data 112 for the utterance. For example, the speech recognition module 150 may produce a word lattice indicating multiple different possible transcriptions for the utterance that corresponds with the audio data 112. Examples of word lattices are shown in FIGS. 4A and 4B. The speech recognition module 150, for example, may use an acoustic model and a language model to generate the word lattice or otherwise identify candidate transcriptions 152 for the utterance. The speech recognition module 150 may also indicate which of the candidate transcriptions 152 are most likely to be correct, for example, by providing likelihood scores and/or rankings for the candidate transcriptions 152. In the present example, the candidate transcriptions 152 include a ranked list of possible transcriptions for the utterance, including "call gym," "call Jim," "all gym," etc.

During stage (D), the computing system 120 uses a semantic parser 155 to determine semantic categories and scores 158 for words or phrases in the candidate transcriptions 152. In general, semantic parsers can access one or more knowledge bases to map a candidate transcription into a formal representation of its meaning. As part of the mapping, for example, words or phrases in the candidate transcription can be categorized and labeled as belonging to one or more semantic categories. Each semantic score 158 may represent a likelihood that a particular word or phrase in a candidate transcription belongs to a particular semantic category.

In the present example, for the candidate transcription "call gym," the semantic parser 155 may determine that the word "call" may belong to an "action" category, and may assign a semantic score of 0.9 for the word to indicate a likelihood that the word belongs to this category. For the candidate transcription "call gym," for example, the semantic parser 155 may also determine that the word "gym" is likely to belong to a "business" category, and somewhat less likely to belong to a "location" category, and thus may assign semantic scores of 0.9 and 0.8 for the word in association with each of the respective categories.

Under certain circumstances, however, the semantic parser 155 may not have enough information in its knowledge base to accurately score certain categories. For example, the semantic parser 155 may identify a particular word or phrase as being a proper noun, e.g., a name, but may lack the context to categorize and label the word. For the candidate transcription "call Jim," the semantic parser 155 may determine that the word "call" is likely to belong to the "action" category, but that the likelihood of the word "Jim," e.g., a name, belonging to either a "contact" category or an "app" category is indeterminate; thus, the semantic parser 155 may assign semantic scores of 0.5 for the word in association with each of the categories. As another example, considering the candidate transcription "all gym," the semantic parser 155 may recognize the word "all" as possibly corresponding to an app, and may thus assign a semantic score of 0.5 for the word in association with the category.

During stage (E), the client device 110 receives information indicating candidate transcriptions 130 and semantic information 140 over the network 118, from the computing system 120. For example, the candidate transcriptions 130 can include the n-best transcription hypotheses, e.g., the n candidate transcriptions 152 with the highest likelihood scores—"call gym," "call Jim," and "all gym" in the present example. The semantic information 140 can include the corresponding semantic categories and scores 158 for the candidate transcriptions. For example, the candidate transcriptions 130 and semantic information 140 can be received by the client device 110 from the computing system 120 as a ranked list of transcriptions with associated metadata, as a speech recognition lattice, or as another suitable data structure, using a suitable data transfer protocol. 130

During stage (F), the client device 110 uses a semantic parser 165, e.g., a local parser at the client device 110, to parse the multiple candidate transcriptions 130. Unlike the semantic parser 155, for example, the semantic parser 165 may have access to information 175, e.g., an application list, a contact list, a calendar, photos, etc., that is accessible by the client device 110 and not by the computing system 120. For example, the information 175 may be stored locally on the client device 110, e.g., in memory, in storage, etc., or may be remotely accessible by the client device 110, e.g., through an application, a user account, etc. By accessing the information 175, for example, the semantic parser 165 can update, e.g., add to and/or modify, the semantic categories and scores 158 determined by the semantic parser 155. In the present example, the semantic parser 165 can access the contact list in local information 175 to determine that "Jim" is a contact included in the user's contact list and is not an app included in the user's application list. As a result, the semantic parser 165 can appropriately update the indeterminate category labels and/or semantic scores that had been associated with the word "Jim" by the semantic parser 155. For example, with respect to the "contact" category, the semantic parser 165 can replace the placeholder value of "0.5" with a score of "1," to indicate that the word is confirmed as a contact. With respect to the "app" category, the semantic parser 165 can replace the value of "0.5" with "0" to indicate that the word is not a name for an installed application.

The semantic parser 165, for example, can also evaluate each of the candidate transcriptions 130 as a whole, based on the updated semantic categories and scores. For example, the semantic parser 165 can determine, for each of the candidate transcriptions 130, a confidence score 180 that indicates how well the assigned semantic category labels meet criteria for understanding the overall meaning of the transcription. Each confidence score 180 can indicate a likelihood that the meaning of the corresponding candidate transcription is understood, e.g., that the semantic information meets criteria for a successful semantic parse of the transcription as a whole. The confidence score may indicate the likelihood that the transcription is a valid statement of a particular type, such as a voice command. In some implementations, multiple confidence scores may be assigned for each candidate transcription, and various confidence scores indicate a likelihood that the candidate transcription represents a different type of statement, such as whether the transcription represents a question, a command, a web query, and so on. In some implementations, the semantic parser 165 identifies certain patterns or combinations of semantic elements as having recognized meanings. The semantic parser 165 may evaluate transcriptions with respect to one or more grammars or rules, or based on training of the semantic parser 165 through supervised or unsupervised machine learning.

In the illustrated example, the semantic parser 165 determines the confidence scores 180 which indicate likelihoods that the respective candidate transcriptions each represent a voice command to the client device 110. The semantic parser 165 is configured to recognize that the word "call" followed by the name of a contact in a contact list represents a voice command. As a result, the semantic parser 165 assigns a confidence score of 0.9 to the candidate transcription "call Jim," which indicates a high likelihood that transcription represents a valid voice command. The confidence scores 180 for the other candidate transcriptions 130 are lower, indicating a lower likelihood that the other candidate transcriptions are recognized voice commands.

During stage (G), the client device 110 selects one of the candidate transcriptions 130, based at least in part on the confidence scores 180 determined by the semantic parser 165. The client device 110 may compare the confidence scores 180 to a threshold, and select a candidate transcription corresponding to the confidence score 180 that satisfies the threshold. In some implementations, the client device 110 selects the candidate transcription 130 having the confidence score 180 indicating the highest level of confidence. In some implementations, the client device 110 selects a candidate transcription based on information about speech recognition confidence as well as semantic information. For example, the client device 110 may select the highest-ranked candidate transcription 130 that has a semantic confidence score 180 that satisfies a predetermined threshold. Thus the client device 110 may evaluate the candidate transcriptions 130 one by one, starting with the highest-ranked candidate transcription 130, until a candidate transcription that satisfies the threshold is found.

In the present example, the client device 110 uses a threshold value of "0.8," which represents the minimum level of confidence for a transcription to represent a valid voice action. The client device 110 determines that the confidence score 180 for the candidate transcription "call Jim," which has a value of "0.9," satisfies the threshold, and selects the candidate transcription "call Jim" in response.

During stage (H), the client device 110 determines the meaning of the selected candidate transcription and performs a corresponding action. For the selected candidate transcription "call Jim" in the present example, the word "call" is identified by the client device 110 as an action to initiate a telephone call, and the word "Jim" is identified as a particular contact in the device's contact list. Thus, the client device 110 determines the phone number for the identified contact, initiates a telephone call to Jim, and presents output 190, e.g., a displayed message, "Calling Jim", to the user 102 indicating that the telephone call has been initiated.

In some implementations, by performing an initial semantic parsing on a server, e.g., the computing system 120, and completing the semantic parsing on a client, e.g., the client device 110, for example, the computational needs of the client may be reduced. Moreover, personalized results can be determined for a user while maintaining the user's privacy and the confidentiality of data on the user's device. Further, parsing quality may be improved, and may be less susceptible to speech recognition errors. As described above, the speech recognition module 150 may generate multiple candidate transcriptions for the utterance "call Jim," including "call gym," "call Jim," and "all gym". In the present example, after an initial semantic parsing on a server, "call gym" may be identified by the server as the best hypothesis of the candidate transcriptions. However, upon completing the semantic parsing for each of the candidate transcriptions on a client, the candidate transcription "call Jim" is identified by the client as a better hypothesis, based on its access to the information 175, and the presence of Jim in a contact list. Thus, by receiving, parsing, and scoring multiple candidate transcriptions at a client device, as opposed to receiving only a best transcription hypothesis, for example, a transcription that may not have been identified as a best transcription hypothesis based on an initial semantic parsing may be reevaluated and selected when a secondary parsing improves the ranking of the transcription.

Figure 2:
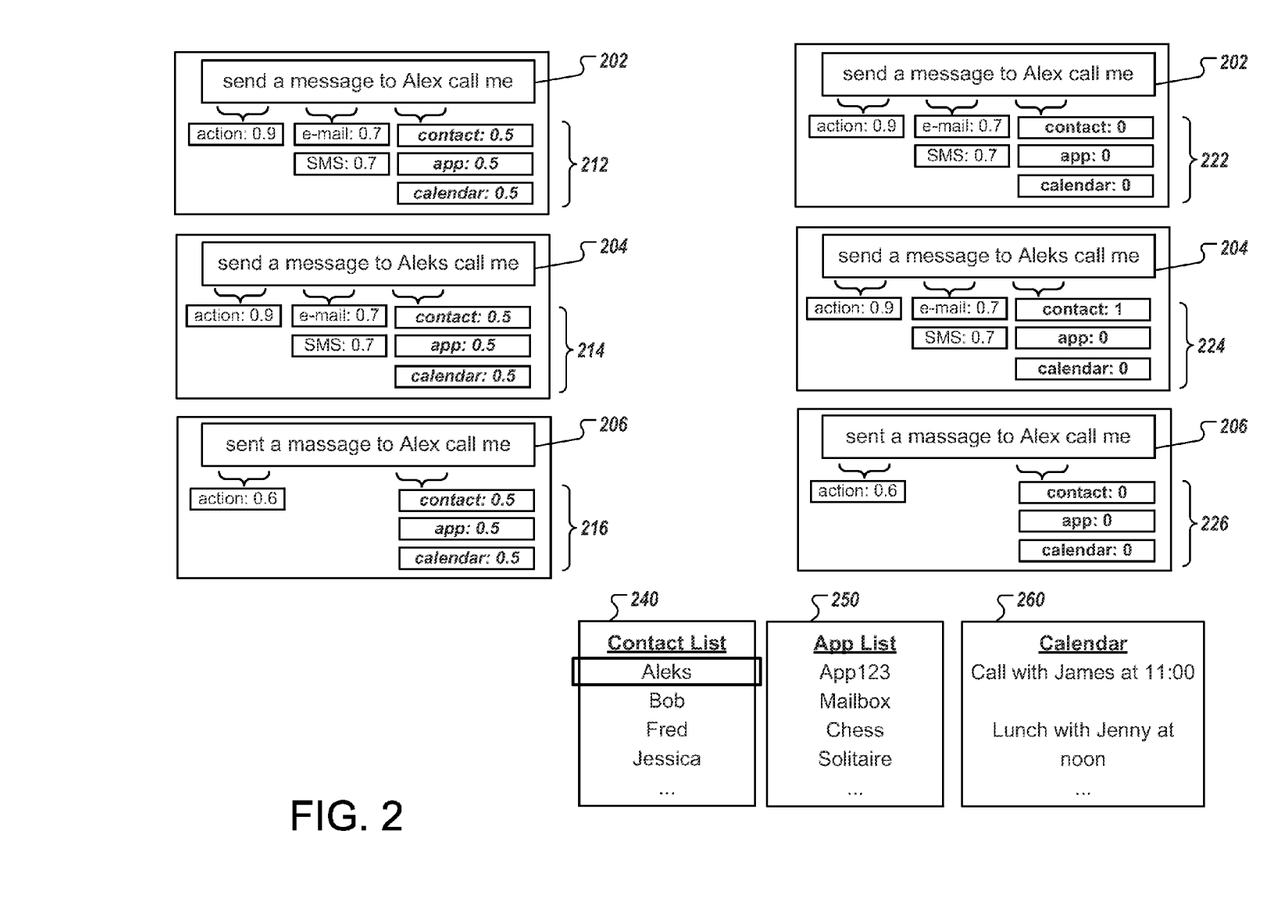
FIGS. 2 and 3 are diagrams that illustrate examples of updating semantic categories and scores.

FIG. 2 is a diagram that illustrates examples of updating semantic categories and scores. In the example of FIG. 2, candidate transcriptions 202, 204, and 206 are shown, each with corresponding semantic information 212, 214, and 216. For example, the candidate transcriptions 202, 204, and 206 can be generated by the speech recognition module 150 (shown in FIG. 1) and the semantic information 212, 214, and 216 can be determined by the semantic parser 155 (also shown in FIG. 1).

In the present example, each of the candidate transcriptions 202, 204, and 206 can be parsed by the semantic parser 155, and various words or phrases in the transcription can be labeled with categories and can be assigned scores indicating likelihoods that the words or phrases belong to the categories. For example, the word "send" is labeled as an "action" with a score of "0.9," the word "message" is labeled as an "e-mail" with a score of "0.7" or as an "SMS" with a score of "0.7." The semantic parser 155, however, may identify other words or phrases as possibly belonging to a category that is to be determined and/or scored by another, different semantic parser, e.g., the semantic parser 165, that has access to information that facilitates the determining and/or scoring. For example, the words "Alex" and "Aleks" are identified by the semantic parser 155 as potentially belonging to either a "contact," "app," or "calendar" category. However, since insufficient information is available to assess the likelihoods, the words are assigned an indeterminate score of 0.5 for each category. The score of "0.5," or another appropriate indicator, may be a signal to a client-based semantic parser that the score for the category should be re-evaluated at the client device. A server is not required to indicate which words or phrases should be evaluated by the client device, however. In some implementations, if appropriate information is not available to classify a term with respect to a particular category, a server-based parser may simply assign no score with respect to the category.

Each of the candidate transcriptions 202, 204, and 206, and the corresponding semantic information 212, 214, and 216 can be provided to a client device, such as the client device 110, shown in FIG. 1. The semantic parsing can be completed by the semantic parser 165 (also shown in FIG. 1) on the client device 110, and the semantic information can be updated as semantic information 222, 224, and 226. In the example, the client device 110 stores or otherwise has access to a contact list 240, an app list 250, and a calendar 260 that were not accessible to the semantic parser 155 at the computing system 120. As a result, the semantic parser 165 at the client device 110 can evaluate words and phrases with respect to a "contact" category based on data in a contact list 240. In some implementations, the contact list may be a phone book, a frequently called list, a frequently messaged list, or other data identifying contacts, and the semantic parser 165 determines whether words or phrases match names in the contact list 240. As another example, for the "app" category, the semantic parser 165 can evaluate whether words and phrases represent app names by comparing the words and phrases with an app list 250 that includes names of apps installed on the client device 110. As another example, for the "calendar" category, the semantic parser 165 can estimate whether words and phrases refer to appointments or other calendar items based on whether or not the words and phrases match data in the calendar 260.

For the candidate transcription 202, e.g., "send a message to Alex call me," for example, the semantic parser 165 at the client device 110 evaluates the word "Alex" with respect to each of the categories "contact," "app," and calendar". The semantic parser 165 determines that the word "Alex" is not present in the contact list 240, the app list 250, or the calendar 260. Thus, in the present example, the semantic information 212 is updated as semantic information 222, and the semantic scores for the word "Alex" can be assigned a score of zero for each of the categories "contact," "app," and "calendar". The semantic parser 165 also evaluates the candidate transcription 206 and determines the same scores are also determined for the word "Alex."

The candidate transcription 204, e.g., "send a message to Aleks call me", is also parsed by the semantic parser 165, and the semantic parser 165 determines that the word "Aleks" exists in the contact list 240, but not in the app list 250 nor the calendar 260. As a result, the semantic parser 165 updates the semantic information 214 as semantic information 224, by assigning a semantic score of "1.0" for the word for the "contact" category, and a semantic score of zero for the word for each of the "app" and "calendar" categories.

In some implementations, the client-based semantic parser 165 determines which portions of transcription to evaluate and which semantic categories to re-score based on output of the server-based semantic parser 155. For example, a score of "0.5" with respect to a semantic category may be an indication that a new score should be provided for a word with respect to the category. To minimize processing, the client-based semantic parser 165 may perform semantic parsing only for words that a server indicates should be re-scored.

In some implementations, the semantic parser 165 may independently parse candidate transcriptions. For example, the semantic parser 165 may evaluate each of the words of candidate transcriptions with respect to certain semantic categories, e.g., "contact," "app," and "calendar," whether or not the server-based parser indicates a potential match to those categories. A client-based semantic parser 165 may provide scores for any appropriate semantic category, including scores for categories not identified in data from a server. For example, the client-based semantic parser 165 may generate scores for a "music" category that was not identified by a server. As another example, the client-based semantic parser 165 may provide an additional score with respect to the "action" category, even though data from the server did not indicate that the category should be re-scored. When a server-based semantic parser 155 and client-based semantic parser 165 each provide scores for a word with respect to the same category, the scores may be combined, e.g., averaged, weighted, etc., or one score can be selected, e.g., the score from the client-based semantic parser 165 can be used.

Semantic scores for individual words and phrases in a candidate transcription can be aggregated and can be used to generate an overall confidence score that represents a likelihood that the candidate transcription accurately represents an utterance. For example, the semantic parser 165 can aggregate, e.g., multiply, sum, etc., the semantic scores for words and phrases of each of the candidate transcriptions 202, 204, and 206 to generate corresponding confidence scores, and can compare the scores to a threshold value, e.g., 0.6, 0.7, 0.8, or another suitable value, and/or to each other to identify a candidate transcription that best represents the utterance. In the present example, based on the updated semantic scores associated with the semantic information 222, 224, and 226, the semantic parser 165 identifies the candidate transcription 204, e.g., "send a message to Aleks call me," as the transcription as having the best semantic parse characteristics, and as having the highest likelihood of being correct.

Figure 3:
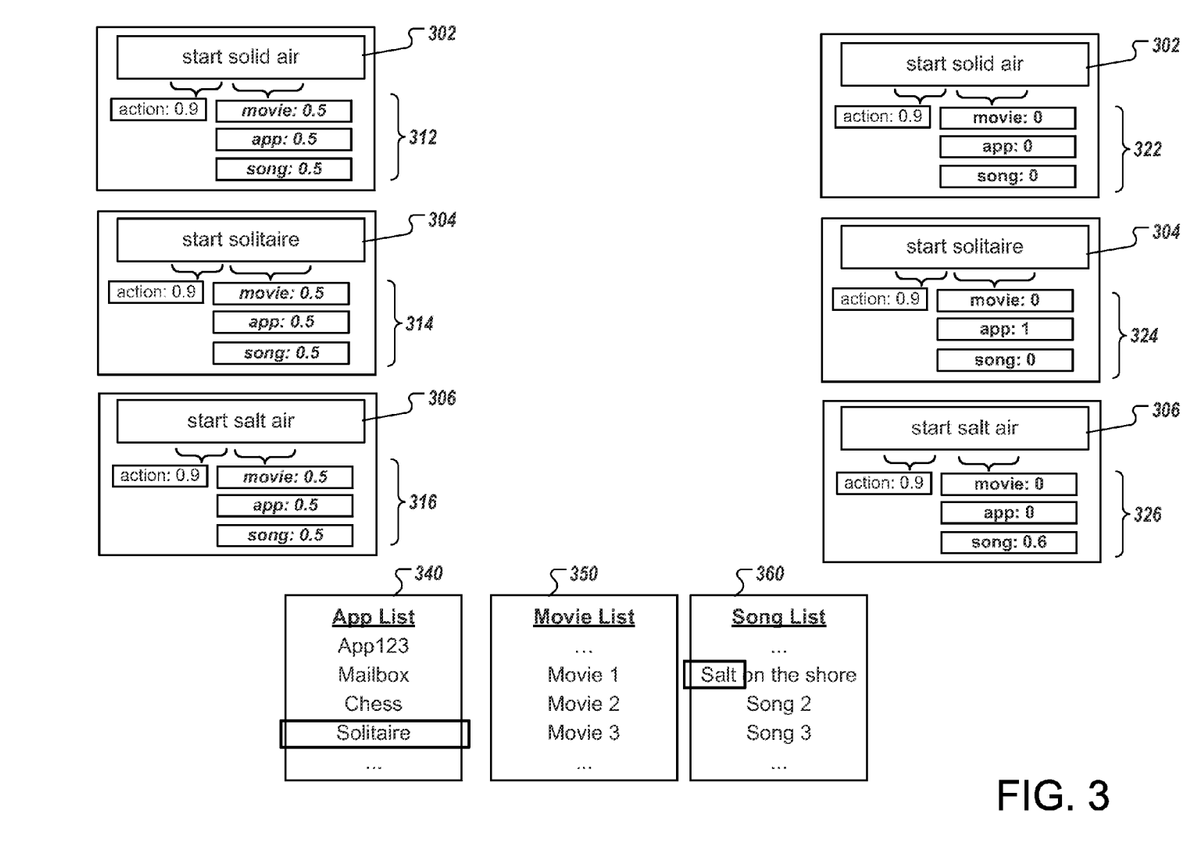

FIG. 3 is a diagram that illustrates examples of updating semantic categories and scores. In the example of FIG. 3, candidate transcriptions 302, 304, and 306 are shown, each with corresponding semantic information 312, 314, and 316 determined by the server-based semantic parser 155 (also shown in FIG. 1). The semantic parser 155 determines that the word "start" has a high likelihood of referring to an command, and assigns a score of "0.9" for the semantic category of "action." The semantic parser 155 estimates that the phrases "solid air," "solitaire," or "salt air" might belong to either a "movie," "app," or "song" category, but because the semantic parser 155 lacks information about the client device the user is using, the semantic parser assigns an indeterminate score of "0.5" for each of these categories.

Each of the candidate transcriptions 302, 304, and 306, and the corresponding semantic information 312, 314, and 316 can be provided to a client device, such as the client device 110, shown in FIG. 1, where the semantic parsing can be completed by the semantic parser 165 (also shown in FIG. 1), and the semantic information can be updated as semantic information 322, 324, and 326. The semantic parser 165 has access to an app list 340 indicating applications installed on the client device 110, a movie list 350 indicating movies stored on or accessible to the client device 110, and a song list 360 indicating songs that are stored on or accessible to the client device 110.

In evaluating the candidate transcriptions 302, 304, and 306, the semantic parser 165 determines that the words in the phrase "solid air" do not match any of the information in the app list 340, the movie list 350, or the song list 360. As a result, the semantic parser 165 assigns semantic scores for the phrase "solid air" having a value of zero for each of the categories "movie," "app," and "song".

As another example, the semantic parser 165 determines that the word "solitaire" exists in the app list 340, and assigns a semantic score of "1.0" for the word with respect to the "app" category. Because the word "solitaire" does not occur in the movie list 350 or the song list 360, a semantic score of zero for the word "solitaire" can be assigned for each of the "movie" and "song" categories.

The semantic parser 165 also identifies a partial match between the phrase "salt air" and a song, e.g., "salt on the shore," in the song list 360, and assigns a semantic score of "0.6" for the phrase "salt air" for the "song" category to indicate the partial match. As neither the phrase "salt air," nor any of its component terms, e.g., the term "salt" and the term "air," exists in the app list 340 or the movie list 350, the semantic parser 165 may assign a semantic score of zero for the phrase for each of the "app" and "movie" categories.

In some implementations, a semantic parser may determine that parsing has successfully estimated the meaning of a transcription when certain criteria are satisfied. For example, parsing may be considered successful when a particular combination of semantic elements occurs, or when at least a certain portion of a transcription has been assigned a likely category label. In some instances, a parsing may be considered successful when an overall confidence score or individual semantic scores satisfy predetermined thresholds. In the example of FIG. 3, both of the candidate transcriptions 304 and 306 may be considered to have been parsed successfully, since each word or phrase has been assigned a semantic category with a score greater than "0.5," and the assigned categories represent recognized types of actions, e.g., starting an app, or starting a movie. To select from among the potential interpretations, a confidence score can be generated. The candidate transcription 304, e.g., "start solitaire," may be assigned a higher confidence score than the candidate transcription 306, e.g., "start salt air," based on an aggregation of the respective semantic scores, e.g., an aggregation of "0.9" and "1.0", vs. an aggregation of "0.9" and "0.6". As a result, although a possible interpretation of each of the candidate transcriptions 304, 306 has been identified, the candidate transcription 304 may be selected as the most likely to be correct.

In the examples of FIGS. 2 and 3, the semantic scores determined by the semantic parser 165, e.g., scores determined at the client device 110, replace the semantic scores received from the semantic parser 155, e.g., scores determined by the computing system 120. In other implementations, however, the semantic parser 155 may generate more precise semantic scores, e.g., a score other than "0.5", or "indeterminate," for categories that are also to be identified/scored by the semantic parser 165. Semantic scores received from the semantic parser 155 and semantic scores determined by the semantic parser 165 may then be averaged or otherwise combined, for example, to produce composite scores to be used as a factor for selecting a best candidate transcription.

In the examples of FIGS. 2 and 3, actions related to sending messages and starting applications or media players are described. In other implementations, however, other actions may be performed, and/or other types of user/device information may be used for determining semantic categories and scores. For example, an action may refer to a calendar appointment. Considering a candidate transcription of "move up today's tee time at three oaks by an hour," the semantic parser 165 may access a user's calendar to determine whether the phrases "tee time" or "three oaks" are included in a calendar entry. As another example, the semantic parser 165 may access information associated with a current geographic location of the client device 110 to identify local business names that may be included in a candidate transcription. For a candidate transcription of "Call Joe's Pizza," for example, the semantic parser 155 may identify the phrase "Joe's Pizza" as possibly belonging to a business category, and possibly belonging to a contact category. The semantic parser 165, however, can access a list of restaurants within delivery range of the client device 110, and can identify "Joe's Pizza" as such a business.

FIG. 4A is an example of a word lattice 400 that may be provided by a speech recognition system. The word lattice 400 represents multiple possible combinations of words that may form different candidate transcriptions for an utterance.

The word lattice 400 includes one or more nodes 402a-g that correspond to the possible boundaries between words. The word lattice 400 includes multiple edges 404a-404l for the possible words in the transcription hypotheses that result from the word lattice 400. In addition, each of the edges 404a-l can have one or more weights or probabilities of that edge being the correct edge from the corresponding node. The weights can be determined by the speech recognizer module 150 (shown in FIG. 1), for example, and can be based on a confidence in the match between the speech data and the word for that edge and how well the word fits grammatically and/or lexically with other words in the word lattice 400.

For example, initially, the most probable path through the word lattice 400 may include the edges 404c, 404e, 404i, and 404k, which have the text "we're coming about 11:30." A second best path may include the edges 404d, 404h, 404j, and 404l, which have the text "deer hunting scouts 7:30."

Each pair of nodes may have one or more paths corresponding to the alternate words in the various candidate transcriptions. For example, the initial most probable path between the node pair beginning at the node 402a and ending at the node 402c is the edge 404c "we're". This path has alternate paths that include the edges 404a, 404b "we are" and the edge 404d "deer".

In some implementations, a server system, such as the computing system 120 of FIG. 1, may provide information about candidate transcriptions for an utterance by providing a word lattice. Because each different path through the lattice 400 represents a different possible transcription, the lattice 400 may provide information about a larger number and variety of potential transcriptions than an n-best list.

The lattice 400 may include semantic information, resulting in a semantic lattice. For example, in addition to weights or probabilities for the edges 404a-404l based on output of a speech recognition system, e.g., a language model, the word lattice can also include weights or probabilities for edges 404a-404l based on the output of a semantic parser, e.g., the server-based semantic parser 155. For example, one or more of the edges 404a-404l may be assigned semantic scores that indicate likelihoods that the word associated with the edge 404a-404l belongs to a certain semantic categories. For example, the edge 404l could be assigned a score indicating a likelihood that the word "7:30" represents an address, another score indicating a likelihood that the word corresponds to a time, another score indicating a likelihood that the word represents a date, and so on.

The lattice 400, including semantic scores for various words, can be provided to a client device for further processing. A client-based parser may modify semantic scores in the lattice 400 or add new semantic scores to the lattice 400. For example, using information about user's calendar, the client device may add a semantic score for the edge 404l that indicates a likelihood that the word "7:30" refers to a calendar appointment for the user. After updating and/or adding semantic scores, the client device can evaluate multiple paths through the lattice 400, and select a path estimated to represent the best transcription. In selecting a path, the client device can take into account language model weights and semantic weights to the edges 404a-404l. For example, the client device may determine a confidence score for each of multiple paths through the lattice 400, or potentially all possible paths through the lattice 400, where the confidence score is based on speech recognition weights, semantic scores determined by a server system, and semantic scores determined by the client-based semantic parser.

FIG. 4B is an example of a hierarchical word lattice 450 that may be provided by a speech recognition system. The word lattice 450 includes nodes 452a-452l that represent the words that make up the various candidate transcriptions for an utterance. The edges between the nodes 452a-452l show that the possible candidate transcriptions include: (1) the nodes 452c, 452e, 452i, and 452k "we're coming about 11:30"; (2) the nodes 452a, 452b, 452e, 452i, and 452k "we are coming about 11:30"; (3) the nodes 452a, 452b, 452f, 452g, 452i, and 452k "we are come at about 11:30"; (4) the nodes 452d, 452f, 452g, 452i, and 452k "deer come at about 11:30"; (5) the nodes 452d, 452h, 452j, and 452k "deer hunting scouts 11:30"; and (6) the nodes 452d, 452h, 452j, and 452l "deer hunting scouts 7:30".

Again, the edges between the nodes 452a-452l may have associated weights or probabilities based on the confidence in the speech recognition and the grammatical/lexical analysis of the resulting text. In this example, "we're coming about 11:30" may currently be the best hypothesis and "deer hunting scouts 7:30" may be the next best hypothesis. One or more divisions 454a-454d can be made in the word lattice 450 that group a word and its alternates together. For example, the division 454a includes the word "we're" and the alternates "we are" and "deer". The division 454b includes the word "coming" and the alternates "come at" and "hunting". The division 454c includes the word "about" and the alternate "scouts" and the division 454d includes the word "11:30" and the alternate "7:30".

The lattice 450 may be provided to a client device to indicate candidate transcriptions for an utterance, and the lattice 450 may include semantic information. In some implementations, node 452a-452l may have semantic scores for one or more semantic categories assigned by the semantic parser 155. After the lattice 450 is received by the client device, the semantic parser 165 may modify semantic scores or add semantic scores for additional semantic classes. For example, the word "11:30" and the alternate "7:30" included in the division 454d may each be labeled as a "time" by the semantic parser 155. The semantic parser 165 at the client device may then label the word "11:30" and the alternate "7:30" as belonging to a "calendar item" category, based on calendar information stored at the client device 110. The semantic parser 165 can score multiple paths through the lattice 450, thus allowing the semantic parser 165 to evaluate a potentially greater number of candidate transcriptions than might be provided in a list. Additional scores may be added, and/or existing scores may be modified by the semantic parser 165.

Figure 5:
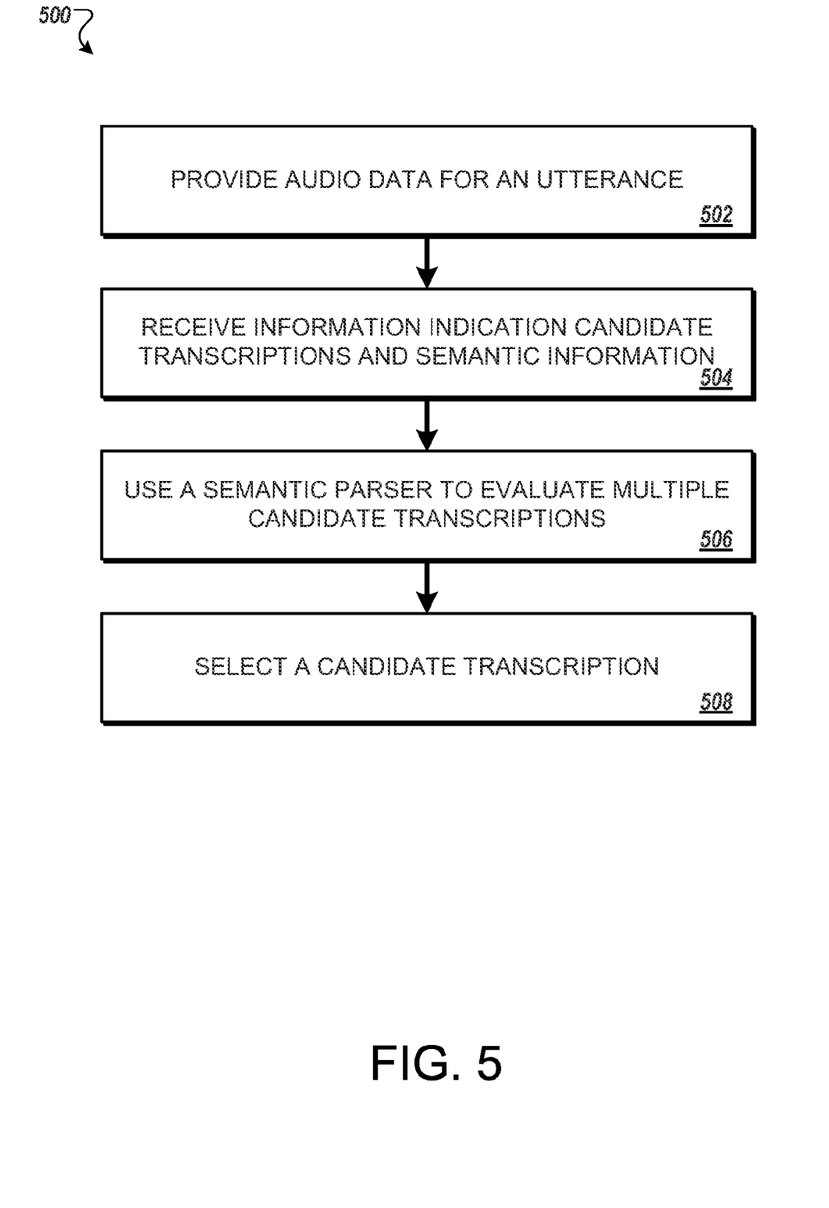
FIG. 5 is a flow diagram that illustrates an example of a process for evaluating transcriptions

FIG. 5 is a flow diagram that illustrates an example of a process 500 for evaluating transcriptions. The operations of the process 500 may be performed by one or more computing devices, such as the client device 110 of FIG. 1.

Audio data for an utterance is provided (502). Referring to FIG. 1, for example, the client device 110 can provide the audio data 112 over the network 118, to the computing system 120. The audio data 112, for example, may be a digital representation of the utterance, and may include recorded or streamed audio signals, and/or may include audio features extracted from the signals. The utterance, e.g., "call Jim," for example, may represent a voice command of the user 102 for an action to be performed at least in part by the client device 110.

Information is received that indicates multiple candidate transcriptions for the utterance and semantic information for the candidate transcriptions (504). For example, the client device 110 can receive the candidate transcriptions 130 and semantic information 140 for the candidate transcriptions over the network 118, from the computing system 120. The candidate transcriptions 130 and corresponding semantic information 140, for example, may be determined by the speech recognition module 150 and the semantic parser 155.

In some implementations, the information that indicates multiple candidate transcriptions for the utterance may include information indicating a list of candidate transcriptions. For example, the candidate transcriptions 130 may include a ranked list of the n-best transcription hypotheses, e.g., the best 3, 5, 10, or other suitable number, determined by the speech recognition module 150 and the semantic parser 155.

In some implementations, the information that indicates multiple candidate transcriptions for the utterance may include a speech recognition lattice indicating multiple possible transcriptions for the utterance. For example, the candidate transcriptions 130 may be included in a word lattice, such as the word lattice 450 shown in FIG. 4B, that represents multiple possible combinations of words that may form multiple different candidate transcriptions for an utterance. Through a speech recognition lattice, for example, a best transcription hypothesis may be identified by evaluating probabilities associated with edges between nodes, e.g., words, and evaluating category scores for words included in the lattice, and identifying the most likely path based on the probabilities and scores.

In some implementations, the information that indicates semantic information for the candidate transcriptions includes information indicating first semantic scores for one or more terms in the candidate transcriptions. Semantic scores can indicate likelihoods that terms belong to one or more semantic categories. For example, the semantic information 140 for the candidate transcriptions 130 may include semantic categories and scores 158 determined by the semantic parser 155. Using one or more knowledge bases available to the semantic parser 155, for example, the semantic parser 155 may determine that the term "gym" is most likely a business, and somewhat less likely a location; thus, the semantic parser 155 may label the term as possibly belonging to a "business" category (with a semantic score of 0.9), and as possibly belonging to a "location" category (with a semantic score of 0.8).

A semantic parser is used to evaluate each of at least a plurality of the candidate transcriptions (506). For example, the client device 110 can use the semantic parser 165 to evaluate each of the candidate transcriptions 202, 204, and 206 (shown in FIG. 2).

In some implementations, using the semantic parser at the client device may include determining second semantic scores for one or more terms in the candidate transcriptions. Referring to FIG. 2, for example, the first semantic scores, e.g., the scores indicated by the semantic information 212, 214, and 216, received by the client device 110 from the computing system 120, may indicate likelihoods that terms belong to first semantic categories, and the second semantic scores, e.g., the scores indicated by the semantic information 222, 224, and 226 determined by the semantic parser 165 at the client device 110, may indicate that terms belong to second semantic categories.

In some implementations, the second semantic categories may include one or more semantic categories not included in the first semantic categories. For example, the semantic parser at a client device may assign score for one or more semantic categories for which the server-based semantic parser did not provide a score. As another example, the semantic parser 155 may identify a particular term in a candidate transcription as belonging to a generalized category such as "unknown media type". Upon receiving the candidate transcription, for example, the client device 110 may use the semantic parser 165 to evaluate the particular term. Based on the term's surrounding context in a candidate transcription, and based on information available to the client device 110, for example, the semantic parser can specifically categorize the term, e.g., as a "movie," "app," "song," etc.

In some implementations, the second semantic scores may be determined at a client device using information that is available at the client device and that is not available to a device that generated the first semantic scores. For example, referring to FIG. 2, the client device 110 may have access to the contact list 240, app list 250, and calendar 260 that is unavailable to the computing system 120. The semantic parser 155 executed by the computing system 120, for example, can generate first semantic scores 212, 214, and 216. The semantic parser 165 executed by the client device 110, for example, can then generate second semantic scores 222, 224, and 226, using information available from the contact list 240, app list 250, and calendar 260.

In some implementations, using a semantic parser to evaluate each of the candidate transcriptions may include receiving a semantic parser confidence score for each of the candidate transcriptions. For example, based on semantic scores included in the semantic information 222, 224, and 226, the semantic parser 165 can generate an overall confidence score for each of the corresponding candidate transcriptions 202, 204, and 206 that represents a likelihood that the meaning of each respective candidate transcription is understood.

One of the candidate transcriptions is selected based on at least the received semantic information and the output of the semantic parser for the plurality of candidate transcriptions that are evaluated (508). Referring to FIG. 1, for example, the candidate transcription "call Jim" may be selected, based on the received semantic information 140 and based on the output of the semantic parser 165.

In some implementations, one of the candidate transcriptions may be selected based on the first semantic scores and the second semantic scores. For example, first semantic scores for terms determined by the semantic parser 155 can be evaluated along with second semantic scores for terms determined by the semantic parser 165. As another example, the first semantic scores determined by the semantic parser 155 may be averaged or otherwise combined with the second semantic scores determined by the semantic parser 165 to generate composite semantic scores for the words and phrases included in each of the candidate transcriptions 130.

In some implementations, one of the candidate transcriptions may be selected based on the semantic parser confidence scores received for each of the candidate transcriptions.

For example, each of the candidate transcriptions 130 may be associated with an overall confidence score, based on the semantic scores determined by the semantic parser 155 and the semantic parser 165. The candidate transcriptions "call gym," "call Jim," and "all gym," for example, may be assigned confidence scores of 0.7, 0.9, and 0.3, respectively. In the present example, "call Jim" may be selected, based on having been assigned a higher confidence score than the other candidate transcriptions.

In some implementations, selecting one of the candidate transcriptions may include determining, based on output of the semantic parser for the candidate transcriptions that are evaluated, that one of the candidate transcriptions represents a voice action. For example, both of the candidate transcriptions "call gym" and "call Jim" are associated with an action to initiate a telephone call. In the present example, the candidate transcription that is determined to represent a voice action and is associated with a higher confidence score may be selected.

Figure 6:
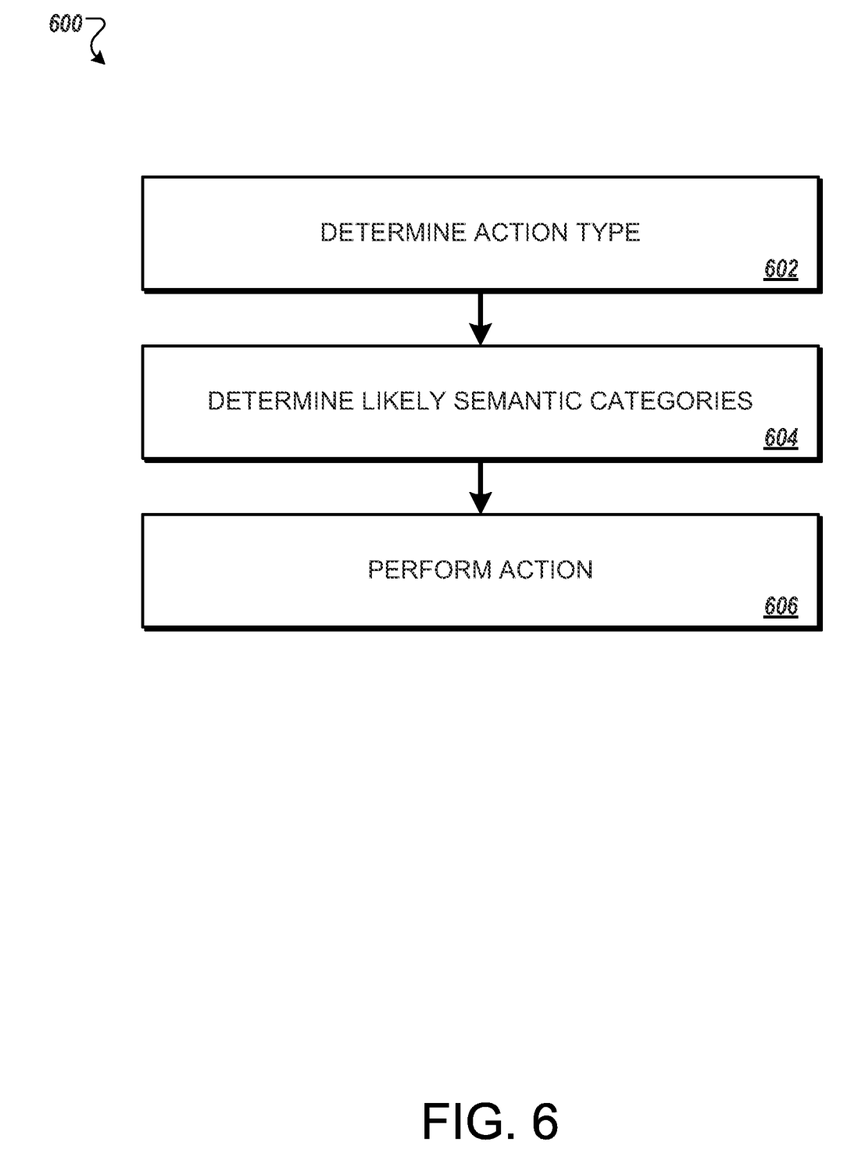
FIG. 6 is a flow diagram that illustrates an example of a process for performing actions based on semantic information.

FIG. 6 is a flow diagram that illustrates an example of a process 600 for performing actions based on semantic information. The operations of the process 600 may be performed by one or more computing devices, such as the client device 110 of FIG. 1. The process 600 may be performed to carry out an action indicated by a voice command, after a transcription for the voice command has been selected.

A type of action indicated by the selected candidate transcription is determined (602). Different words or phrases may correspond to different actions. For example, "call" may indicate initiating a telephone call, "play" may indicate starting a game or media file, "start" or "open" may refer to opening an application. When a semantic parser indicates that a transcription represents a command, the semantic parser may also indicate which of the recognized commands or actions most likely corresponds to the transcription.

Likely semantic categories for words in the selected candidate transcription are determined (604). For example, where words may potentially refer to multiple different semantic categories, the most likely category for each word, or the category that is most relevant to the determined type of action may be selected.

An action is performed according to the determined type of action and the likely semantic categories (606). A client device may identify appropriate applications or code to initiate, as well as formulate arguments or commands to translate the voice command to an action. For example, a selected transcription for an utterance may be, "send a message to my friend john via email saying hey john call me." The output of the semantic parser may indicate, for example, the desired action is to send a message, that an e-mail app should be used, that the contact is "John," and that the message contents should be "hey John call me." Based on the output of the semantic parser, the client device may open the default e-mail application for the client device, determine the e-mail address for the contact "John" and add it to the message, insert the desired text of the message into the body of the message, and then send the message or display the message so that the user may confirm that the message is correct before sending.

Embodiments of all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable storage device for execution by, or to control the operation of, data processing apparatus. The computer-readable storage device may be, for example, a machine-readable storage substrate, a memory device, a composition of matter producing a machine-readable propagated signal, or a combination of one or more of them. The computer-readable storage device may be a non-transitory machine-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method performed by data processing apparatus, the method comprising:
   providing, over a network, audio data for an utterance;
   receiving, at a client device and over the network, information that indicates (i) candidate transcriptions for the utterance and (ii) semantic information for the candidate transcriptions;
   using a semantic parser at the client device to evaluate each of at least a plurality of the candidate transcriptions; and
   selecting one of the plurality of the candidate transcriptions based on at least (i) the received semantic information and (ii) the output of the semantic parser at the client device for the plurality of candidate transcriptions that are evaluated.

2. The method of claim 1, wherein receiving information that indicates semantic information for the candidate transcription comprises receiving information indicating first semantic scores for one or more terms in the candidate transcriptions;
   wherein using the semantic parser at the client device comprises determining second semantic scores for one or more terms in the candidate transcriptions; and
   wherein selecting one of the plurality of candidate transcriptions comprises selecting one of the plurality of candidate transcriptions based on the first semantic scores and the second semantic scores.

3. The method of claim 2, wherein the first semantic scores and the second semantic scores indicate likelihoods that terms belong to one or more semantic categories.

4. The method of claim 3, wherein the first semantic scores indicate likelihoods that terms belong to first semantic categories; and
   wherein the second semantic scores indicate likelihoods that terms belong to second semantic categories, including one or more semantic categories not included in the first semantic categories.

5. The method of claim 2, wherein determining the second semantic scores comprises determining the second semantic scores at the client device using information that is available at the client device and is not available to a device that generated the first semantic scores.

6. The method of claim 1, wherein using a semantic parser to evaluate each of at least a plurality of the candidate transcriptions comprises receiving a semantic parser confidence score for each of the plurality of candidate transcriptions; and
   wherein selecting one of the plurality of the candidate transcriptions comprises selecting one of the plurality of candidate transcriptions based on the semantic parser confidence scores.

7. The method of claim 1, wherein selecting one of the plurality of the candidate transcriptions comprises:
   determining, based on output of the semantic parser for the plurality of candidate transcriptions that are evaluated, that one of the plurality of candidate transcriptions represents a voice action; and
   selecting the candidate transcription determined to represent a voice action.

8. The method of claim 7, further comprising:
   determining a type of action indicated by the selected candidate transcription;
   determining likely semantic categories for words in the selected candidate transcription; and
   performing an action according to the determined type of action and the likely semantic categories.

9. The method of claim 1, wherein receiving the information that indicates multiple candidate transcriptions for the utterance comprises receiving information indicating a list of candidate transcriptions.

10. The method of claim 1, wherein receiving the information that indicates multiple candidate transcriptions for the utterance comprises receiving a speech recognition lattice indicating multiple possible transcriptions for the utterance.

11. A non-transitory computer storage medium encoded with instructions that, when executed by a user device, cause the user device to perform operations comprising:
- providing, over a network, audio data for an utterance;
- receiving, at the user device and over the network, information that indicates (i) candidate transcriptions for the utterance and (ii) semantic information for the candidate transcriptions;
- using a semantic parser at the user device to evaluate each of at least a plurality of the candidate transcriptions; and
- selecting one of the plurality of the candidate transcriptions based on at least (i) the received semantic information and (ii) the output of the semantic parser at the user device for the plurality of candidate transcriptions that are evaluated.

12. The non-transitory computer storage medium of claim 11, wherein receiving information that indicates semantic information for the candidate transcription comprises receiving information indicating first semantic scores for one or more terms in the candidate transcriptions;
- wherein using the semantic parser at the user device comprises determining second semantic scores for one or more terms in the candidate transcriptions; and
- wherein selecting one of the plurality of candidate transcriptions comprises selecting one of the plurality of candidate transcriptions based on the first semantic scores and the second semantic scores.

13. The non-transitory computer storage medium of claim 12, wherein the first semantic scores and the second semantic scores indicate likelihoods that terms belong to one or more semantic categories.

14. The non-transitory computer storage medium of claim 13, wherein the first semantic scores indicate likelihoods that terms belong to first semantic categories; and
- wherein the second semantic scores indicate likelihoods that terms belong to second semantic categories, including one or more semantic categories not included in the first semantic categories.

15. The non-transitory computer storage medium of claim 12, wherein determining the second semantic scores comprises determining the second semantic scores at the user device using information that is available at the user device and is not available to a device that generated the first semantic scores.

16. A system comprising:
- a user device and one or more storage devices storing instructions that are operable, when executed by the user device, to cause the user device to perform operations comprising:
- providing, over a network, audio data for an utterance;
- receiving, at the user device and over the network, information that indicates (i) candidate transcriptions for the utterance and (ii) semantic information for the candidate transcriptions;
- using a semantic parser at the user device to evaluate each of at least a plurality of the candidate transcriptions; and
- selecting one of the plurality of the candidate transcriptions based on at least (i) the received semantic information and (ii) the output of the semantic parser at the user device for the plurality of candidate transcriptions that are evaluated.

17. The system of claim 16, wherein receiving information that indicates semantic information for the candidate transcription comprises receiving information indicating first semantic scores for one or more terms in the candidate transcriptions;
- wherein using the semantic parser at the user device comprises determining second semantic scores for one or more terms in the candidate transcriptions; and
- wherein selecting one of the plurality of candidate transcriptions comprises selecting one of the plurality of candidate transcriptions based on the first semantic scores and the second semantic scores.

18. The system of claim 17, wherein the first semantic scores and the second semantic scores indicate likelihoods that terms belong to one or more semantic categories.

19. The system of claim 18, wherein the first semantic scores indicate likelihoods that terms belong to first semantic categories; and
- wherein the second semantic scores indicate likelihoods that terms belong to second semantic categories, including one or more semantic categories not included in the first semantic categories.

20. The system of claim 17, wherein determining the second semantic scores comprises determining the second semantic scores at the user device using information that is available at the user device and is not available to a device that generated the first semantic scores.

21. A method performed by data processing apparatus, the method comprising:
- providing, from a client device to a server system over a network, audio data for an utterance;
- receiving, at the client device and from the server system over the network, information that indicates (i) candidate transcriptions for the utterance and (ii) semantic information comprising output of a first semantic parser for at least one of the candidate transcriptions;
- using a second semantic parser at the client device to evaluate each of at least a plurality of the candidate transcriptions; and
- selecting one of the plurality of the candidate transcriptions based on at least (i) the received semantic information comprising output of the first semantic parser for at least one of the candidate transcriptions and (ii) the output of the second semantic parser at the client device for the plurality of candidate transcriptions that are evaluated.

22. The method of claim 21, wherein using the second semantic parser at the client device to evaluate each of at least a plurality of the candidate transcriptions comprises accessing information that is available to the client device and is not available to the server system.

23. The method of claim 22, wherein accessing the information that is available to the client device and is not available to the server system comprises accessing calendar information, contact list information, or application list information that is not available to the server system.

24. The method of claim 22, wherein accessing the information that is available to the client device and is not available to the server system comprises accessing information stored at the client device.

25. The method of claim 22, wherein accessing the information that is available to the client device and is not available to the server system comprises accessing information that is remotely accessible by the client device and is not available to the server system.

* * * * *